US005275433A

United States Patent [19]

Martin Klober et al.

[11] Patent Number: 5,275,433
[45] Date of Patent: Jan. 4, 1994

[54] GAS GENERATOR FOR AN AIRBAG

[75] Inventors: Martin Klober, Heideck; Eugen Feuerstake, Erlangen, both of Fed. Rep. of Germany

[73] Assignees: Diehl GmbH & Co., Nuremberg, Fed. Rep. of Germany; Honda Giken Kogyo Kabushiki Kaisha, Tokyo, Japan

[21] Appl. No.: 915,110

[22] Filed: Jul. 17, 1992

[30] Foreign Application Priority Data

Aug. 10, 1991 [DE] Fed. Rep. of Germany ....... 4126527

[51] Int. Cl.5 ............................................. B60R 21/28
[52] U.S. Cl. ..................................... 280/741; 280/736
[58] Field of Search ............... 280/736, 741, 729, 740, 280/742, 743; 422/164–; 102/530, 531

[56] References Cited

U.S. PATENT DOCUMENTS

| 3,776,570 | 12/1973 | Weman | 280/738 |
| 3,843,151 | 10/1974 | Lewis | 280/736 |
| 4,178,017 | 12/1979 | Ishi et al. | 280/740 |
| 4,805,930 | 2/1989 | Takada | 280/739 |
| 4,923,212 | 5/1990 | Cuevas | 280/736 |
| 5,201,542 | 4/1993 | Thuen et al. | 280/736 |

FOREIGN PATENT DOCUMENTS

| 0081747 | 3/1990 | Japan | 280/736 |
| 0958177 | 9/1982 | U.S.S.R. | 280/736 |

*Primary Examiner*—Mitchel J. Hill
*Assistant Examiner*—Paul Dickson
*Attorney, Agent, or Firm*—Scully, Scott, Murphy & Presser

[57] ABSTRACT

A gas generator for an airbag, including a gas-generating material which is based on an azide, an ignition device and at least a single ply or layer consisting of a sieve-netting or mesh fabric. The gas-generating material or compound together with the ignition device are arranged in either a gas-tight and heat-resistant, flexible or elastic, non-fragmenting high-pressure component with gas pressure-dependently opening rupturing or breaking locations, such as a high-pressure bag or pouch constituted from a pressure-and tear-resistant fabric, or from a high-pressure container, and wherein the rupturing or breaking locations of the high-pressure component communicate with a low-pressure bag or pouch constituted from a tear-resistant fabric with outflow or discharge apertures or windows.

13 Claims, 3 Drawing Sheets

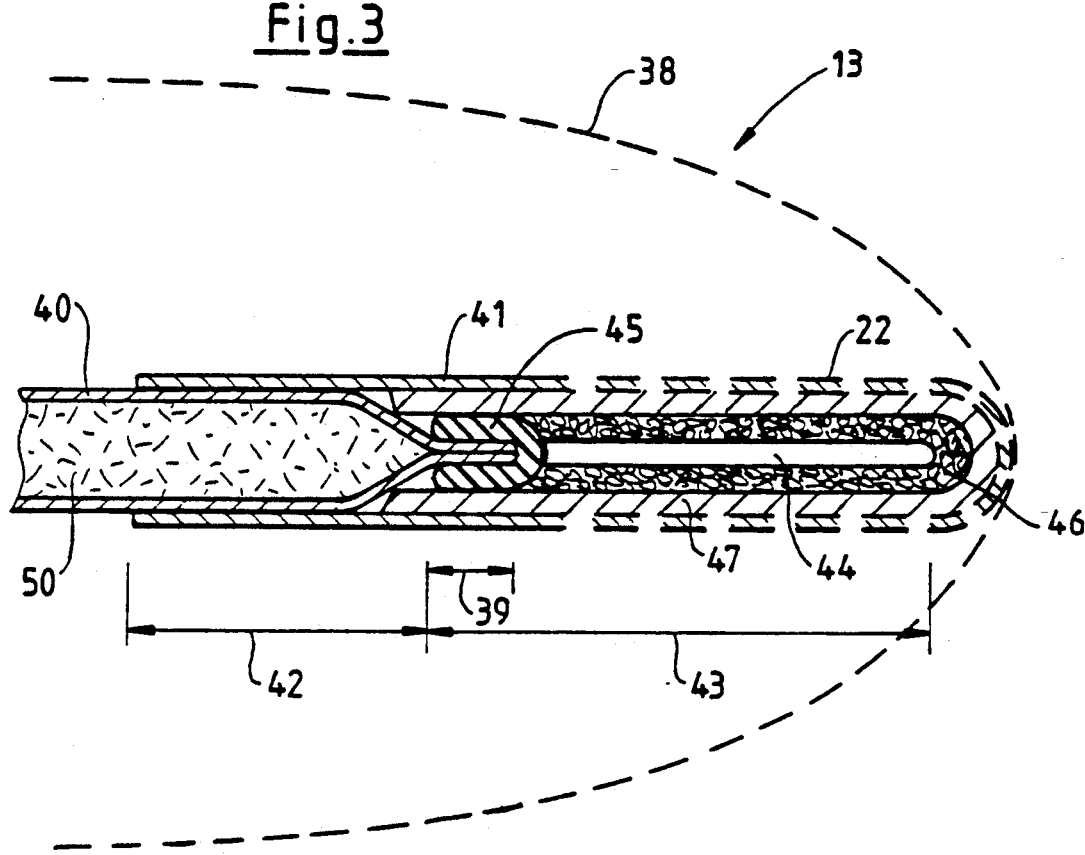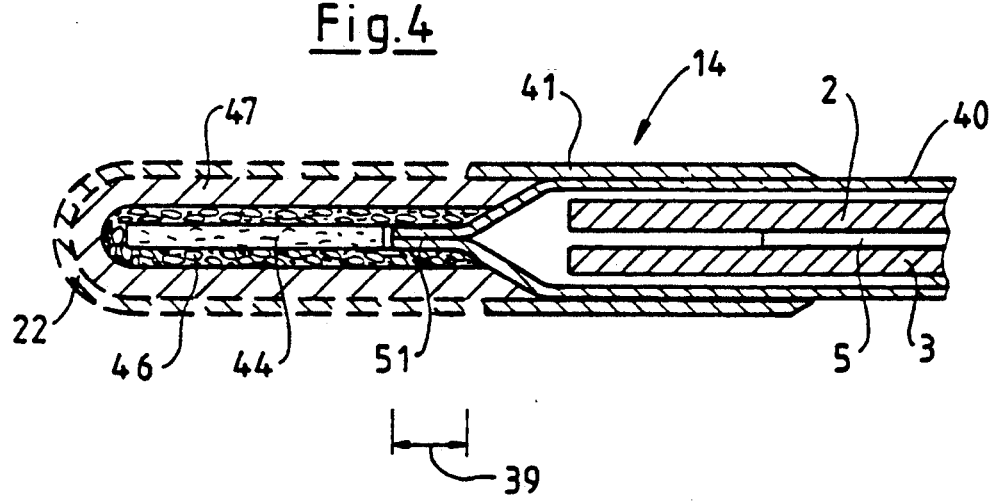

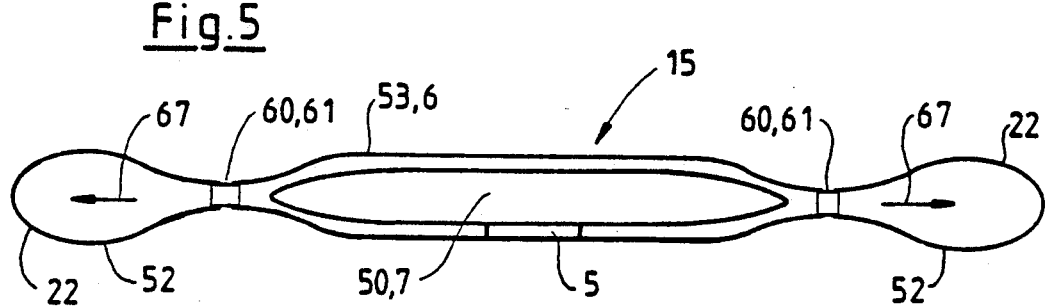
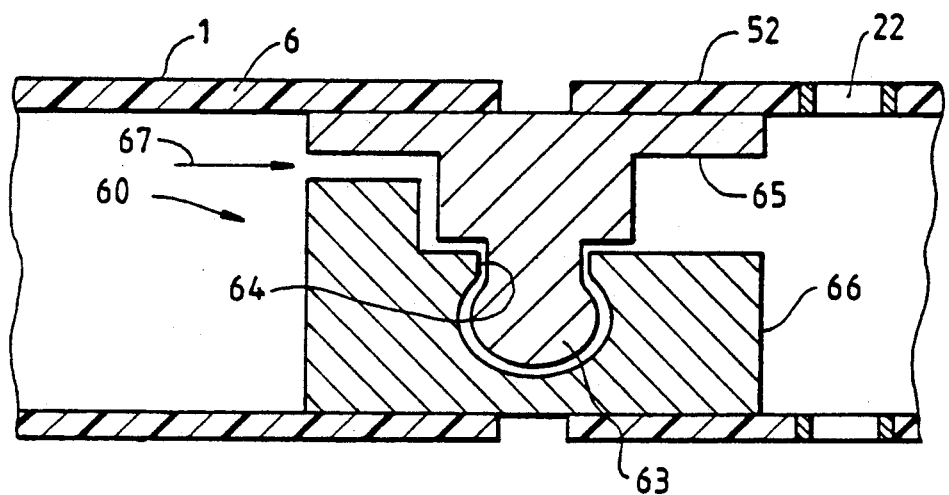
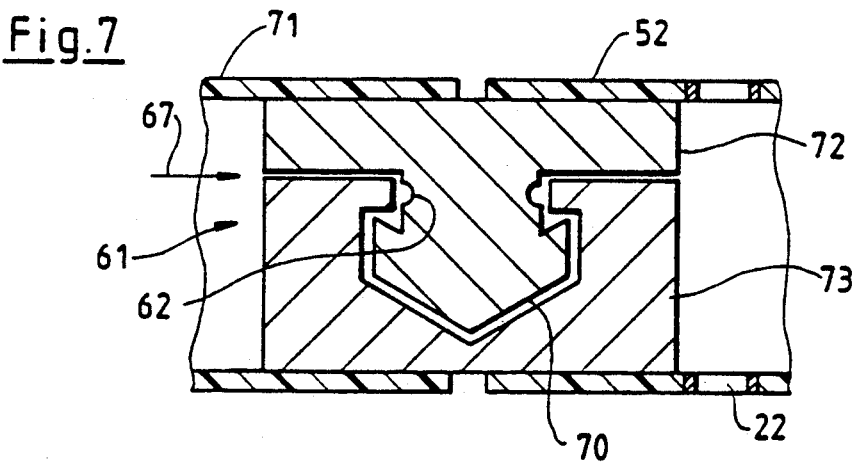

GAS GENERATOR FOR AN AIRBAG

BACKGROUND OF THE INVENTION

1. Field of the Invention

The present invention relates to a gas generator for an airbag, including a gas-generating material which is based on an azide, an ignition device and at least a single ply or layer consisting of a sieve-netting or mesh fabric.

2. Discussion of the Prior Art

From the disclosure of co-pending U.S. patent application Ser. No. 07/888,874, filed May 26, 1992, the latter of which is assigned to the common assignees of the present application, there has become known a gas generator for an airbag in which a multi-layered sieve-netting or mesh fabric is arranged encompassingly about a gas-generating material.

The damping or retarding action which is encountered due to the mesh fabric does not permit the taking place of the necessarily rapid igniting of the gas-generating material; in essence, the burning down of this material is too slow in time. Moreover, in the utilization of this arrangement it is not possible to filter out gaseous health-endangering or toxic products.

SUMMARY OF THE INVENTION

Accordingly, it is an object of the present invention to provide a gas generator possessing an extremely small volume in which there is present a rapid and complete ignition and, above all, a rapid burning down of the gas-generating material or compound. The construction of the gas generator should enable the obtention of a rational and economical manufacture thereof.

The foregoing object is achieved through the intermediary of a gas generator for an airbag of the type described herein, in which the gas-generating material or compound together with the ignition device are arranged in either a gas-tight and heat-resistant, flexible or elastic, non-fragmenting high-pressure component with gas pressure-dependently opening rupturing or breaking locations, such as a high-pressure bag or pouch constituted from a pressure-and tear-resistant fabric, or from a high-pressure container, and wherein the rupturing or breaking locations of the high-pressure component communicate with a low-pressure bag or pouch constituted from a tear-resistant fabric with outflow or discharge apertures.

Advantageous modifications and further features may be ascertained from the detailed description of the invention as set forth hereinbelow. Herein, it is important to the invention to provide for the gas generator which is free of metals. During the generation of gas, no metal fragments or other energy-rich body parts, which could conceivably endanger a person, are emitted into the airbag.

The gas generator possesses small dimensions and is sufficiently flexible or; in essence, displaceable, so as to be easily fitted in place even under difficult installing conditions.

Arranged about a flat or shallow, round or angular bag consisting of a fabric, or a suitable high-pressure container, with roundabout extending rupturing or breaking locations, is a further inflatable bag or pouch which is conformed to the external geometry of high-pressure component, which is permanently and tightly connectable with the inner component, and which extends either completely or partially about the latter in a ring-shaped configuration.

Located within the inner, centrally or also asymmetrically arranged high-pressure component is the gas-generating material or compound which is equipped with an ignition device.

In a rational manner, the constituent of the gas generator which consists of the fabric is produced from a single piece, inasmuch as the high-pressure bag permits itself to be spatially separated in a simple manner from the low-pressure bag or pouch. Through the gas pressure which builds up in the high-pressure bag, there is afforded the necessarily rapid burning down of the gas-generating material. The rupturing or breaking locations, in accordance with the features of the invention, are closed off so as to be openable with a controllable opening force.

Through the tearing open of the rupturing locations there is provided the capability for the streaming out of the combustion products into the outer low-pressure bag.

In accordance with further features of the invention, the gas generator possesses an extremely low or shallow constructional height, so that without any difficulty it can be arranged in the impact steering column head cup of the steering wheel for a motor vehicle, and can even be provided in a multiple stacked arrangement.

Of particular advantage is the aspect that the gas generator can be similarly placed into the folded airbag without any difficulty in a multiple arrangement. In that manner, there can be controlled the preferred mode in the unfolding of the airbag.

Pursuant to a further aspect of the invention, the unfolding of an airbag is controllable in that; for example, the head region of the airbag for a person who is to be protected will be initially unfolded and thereby thusly also supported, whereas the body-protecting region can be unfolded in a time-delayed manner.

At a desired uniform unfolding of the airbag, for this purpose there is adapted the ring-shaped configuration for the low-pressure bag.

In accordance with another aspect of the invention, the combustion gases are cooled in a simple and economically expedient manner. The large surface of the cooling filter components employed for that purpose cools the combustion products flowing therepast and restrains the coarse, solid combustion products.

The detoxifying filter components, which are arranged in a further layer, due to their absorptive capability produce eventual toxic, gaseous and vapor-forming combustion products which are formed as a result of the burning down. These filter components may be of stainless steelwool, aluminum wool, glasswool, stoneware wool, carbon and boron fiber wool, a mixture thereof or in the form of fibermats from these materials, with a mesh width of from 0.5 to 10 mm.

In addition to materials suitable for detoxification, such as filter components in the low-pressure bag, there can be used organic and/or inorganic substances or oxidizing as well as catalytic substances alone or in combination, such as activated charcoal, diatomaceous earth, aluminum oxide, and zeolites, also applicable are materials which can ordinarily find use in breathing mask filters.

In accordance with a further feature of the invention, there is afforded a large-surfaced outflow of the cooled and purified gases from the gas generator into an airbag. The netting-like construction of the discharge window or aperture, during the gas pressure build-up of the gas generator, causes the cohesion of the cooling and detoxifying filter components. Filter components or parts thereof can, as a result, not pass into the airbag.

The gas tightness and temperature resistance of the high-pressure component is improved in that the fabric of the high-pressure bag has the interior thereof rubberized and/or is coated with silicon rubber. Hereby, in a simple and space-saving manner, there are also produced detoxified and/or cooled gases.

A controllable sudden-like overall opening of the high-pressure component, which is controlled by the gas pressure of the high-pressure component, is provided through the provision a reversible or irreversible snap closure which closes off the high-pressure component with respect to the low-pressure bag.

For the gas generator, there is preferred at least one layer or ply of a filter material, whereby there are preferred materials consisting of steelwool and/or activated charcoal.

The steelwool, preferably consisting of a stainless or non-rusting steel, due to the large surface thereof cools the combustion products which stream therepast, and restrains the coarse solid combustion products.

The activated charcoal which is arranged in a further layer, through its high absorptive capacity binds any eventual toxic, gaseous and vaporous combustion products which are produced by the burning down.

The sieve, netting or mesh-like fabric which is located over the discharge aperture of the high-pressure component prevents the egress of the solid or doughy combustion components which are found in the filter unit The gas-permeable, tear-resistant closure in the form of the netting or mesh fabric can be constituted from a metal, plastic, carbon, boron or other fibers. The mesh width is selected such that the gases are allowed to pass therethrough; however, the filter media, however, are securely held back.

The popping noise produced by the unfolding of the airbag is relatively low in its intensity due to the filter units. The inflating sequence allows itself to be controlled through the restraining force of the filter unit, so as to facilitate a "soft" inflating of the airbag. As a result thereof, this avoids any danger of injuring the passengers in the vehicle through a sudden inflating sequence

BRIEF DESCRIPTION OF THE DRAWINGS

Exemplary embodiments of the invention may now be more readily ascertained from the following detailed description thereof, taken in conjunction with the accompanying drawings; in which:

FIG. 3 illustrates a fragmentary sectional view of a further embodiment of a gas generator;

FIG. 4 illustrates a fragmentary sectional view of a still further embodiment of a gas generator;

FIG. 5 illustrates a hose-shaped gas generator;

FIG. 6 illustrates a snap closure for the gas generators of FIGS. 1 through 5; and FIG. 7 illustrates a further embodiment of a snap closure for the gas generators pursuant to FIGS. 1 through 5.

DETAILED DESCRIPTION

Figure 1:
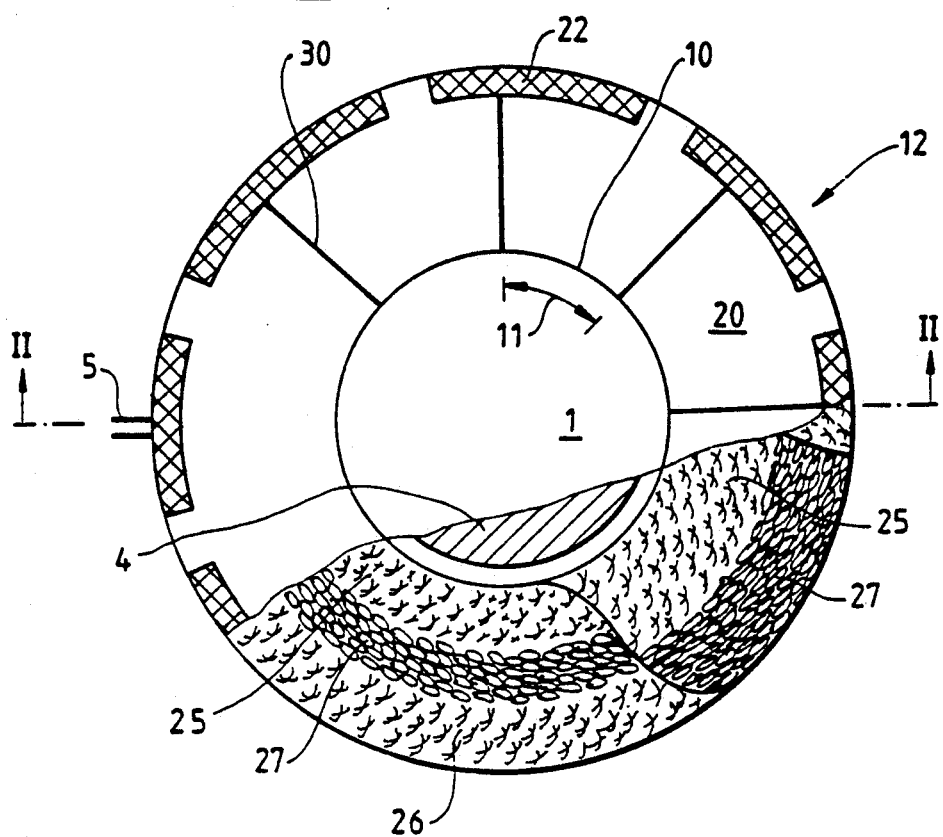
FIG. 1 illustrates a top plan view, partly in section, of a gas generator for an airbag.
Figure 2:
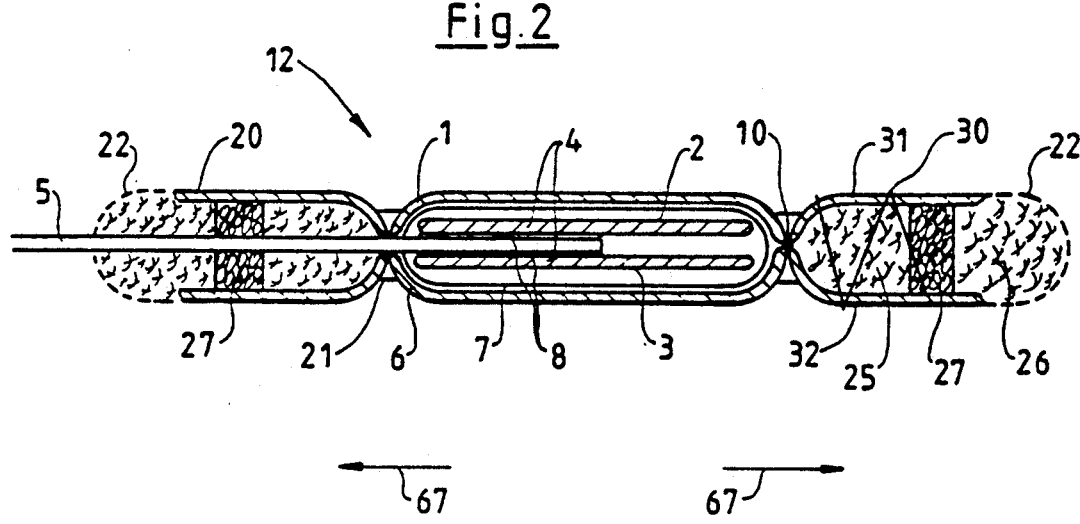
FIG. 2 illustrates a transverse sectional view along line II—II in FIG. 1.

In accordance with drawing FIGS. 1 and 2, a high-pressure bag or pouch 1 of a gas generator 12 are two gas-generating compounds or materials 4 which are constructed in the shape of foils 2, 3, and a pyrotechnic ignition cable 5. The high-pressure bag 1 consists of a dense, pressure and tear-resistant fabric 6, which is reinforced through glass fibers. The gas-generating materials 4 are welded water-vapor imperviously with a portion of the ignition cable 5 into a foil 7. The foils 2, 3 are internally coated, facing the ignition cable 5, with a rapidly combusting ignition compound 8. The gas-generating material 4 is constructed on an azide basis with a nitrate and at least one binding medium.

The high-pressure bag 1 is closed off by means of seams 10. These seams 10 serve as rupturing locations upon the exceeding of a specified gas pressure in the high-pressure bag 1. The seams 10 extend over sectors 11.

Fixedly connected with the high-pressure bag 1 is a ring-shaped or toroidal low-pressure bag 20 through adhesion along an adhesive seam or juncture 21. The low-pressure bag 20 consists of a tear-resistant mixed or composite fabric, whereby the fabric is gas-tight in nature up to a discharge aperture or window 22.

In the low-pressure bag 20 there is arranged an inner ring 25, constituted from stainless steelwool; an outer ring 26, similarly of stainless steelwool, and introduced therebetween is an activated charcoal layer forming an intermediary or spacer ring 27.

For effectuating the fixing of the rings 25 through 27, consisting of stainless steelwool and activated charcoal, within the low-pressure bag 20, the latter is provided with tear-resistant seams 30. The seams 30 reach from the upper or top side 31 to the lower or bottom side 32 of the low-pressure bag 20.

After the igniting of the gas generating materials 4 through the ignition cable 5, the materials 4 convert themselves into gas, up to a specified gas pressure at which time the seams 10 will tear open. As a result thereof, the sectors 11 which are arranged about the circumference of the high-pressure bag 1 are opened, and the gas is cooled within the inner ring 25 and any eventually encountered solids particles are caught. During the burning down of the gas-generating material, the foil 7 also burns down.

The gas which is initially precooled through the inner ring 25 is thereafter detoxified by means of the intermediate ring 27 which is constituted from the activated charcoal layer, and then passes into the outer ring 26 which is constituted from stainless steelwool. From there, the cooled and cleansed gas exits through the large-surfaced discharge aperture or window 22 into the sack of an airbag (not shown).

In accordance with FIG. 3, in a gas generator 13 a high-pressure bag 40 is overlapped by a low-pressure bag 41 in conformance with a segment 42, whereby the segment 42 has joints or seams (not shown) provided therein for connection of the high-pressure bag 40 with the low-pressure bag 41.

A closure of the high-pressure bag 40 is effected in the region of its overlapping end sections 39 through an application of a spray of a plastic material 45. A supporting fabric 44 for the detoxified filter components 46 is constructed in a ring-shaped or toroidal form.

The supporting fabric 44 is encompassed at both sides in a U-shape with a detoxifying filter component 46 and a cooling filter component 47 consisting of stainless steelwool.

Upon the ignition of a gas-generating material 50 which is present in a granulated form, at a specified pressure value the plastic spraying 45 will tear open, so that the gas initially streams through the supporting fabric 44 and through the detoxifying filter components 46 so as to only thereafter be cooled by the cooling filter components 47. The outflow into the airbag (not shown) is then effected through the discharge apertures 22. The supporting fabric 44 maintains the detoxifying filter components 46 at an inflated low-pressure bag 41, as shown by the phantom-line 38, in an operative position.

In conformance with FIG. 4, in a gas generator 14 the end sections 39 thereof are closed off by means of an adhesive layer 51. After the ignition of the foils 2, 3 consisting of gas-generating material 4 by means of the ignition cable 5, at a specified pressure value encountered within the high-pressure bag 40, the adhesive layer 51 tears apart so that, as in the previously-described manner, the gas will flow out and be treated in accordance with the filter components 46, 47.

A hose-like gas generator 15 of a pressure-resistant fabric 6, which is fire-retardant for at least a short period of time; in accordance with FIG. 5, possesses snap closures 60 on both sides facing in the direction towards a second low-pressure bag 52. The snap closures 60, 61 pursuant to FIG. 6 and 7 open in the presence of a specified gas pressure in a high-pressure bag 53 through an unsnapping or also through a tearing of a rupturing location 62.

The low-pressure bag 52 consists of a latticed fabric, such as a glassfiber fabric with suitable discharge apertures or windows 22.

In the case of utilization in which a detoxification of the pressurized gas is not necessary, the above-described exemplary embodiment is suitable, whereby the cooling filter components 47 can be eliminated. Significant gas cooling is achieved in itself through the latticed fabric due to the expansion of the gas.

The bar-shaped or ring-shaped snap closures 60, 61 pursuant to FIGS. 6 and 7 can economically constructed as injection-molded plastic components. At a corresponding pressure in the high-pressure bag 53, in the bar-shape constructed snap closure 60 a head portion 63 snaps out of a retainer part 64, so that the pressurized gas flows in the direction of arrow 67. A head base 65 and a retainer base 66 are fixedly connected with the fabric 6 of the respective high-pressure and low-pressure bags 53, 52, for example, through the intermediary of brazing or welding.

The irreversible snap closure 61 pursuant to FIG. 7 is constructed similarly to the reversible snap closure 60 of FIG. 6. The difference resides in that, on the one hand, the head 70 which is once snapped into a retainer base 73 can no longer be detached from the retainer base 73, so that a release of the latching action of the snap closure 61 is only possible through a rupturing location 62 provided at the neck portion of the head 70.

At a corresponding gas pressure in a high-pressure container 71, the rupturing or breaking location 62 will tear, and the pressurized gas then flows along the direction of arrow 67 into the low-pressure bag 52. The high-pressure bag 71 is adhesively fastened to the head base and the retainer base 72, 73.

Suitable for the high-pressure container 71 is every pressure-resistant, and if necessary, fire-retardant, non-fragmenting material, such as silicon-coated soft polyvinyl chloride, polyethylene, fiberglass-reinforced plastic materials and the like.

What is claimed is:

1. A gas generator for an airbag comprising:
    a) a gas-generating material based upon an azide;
    b) an ignition means operatively connected to the gas-generating material;
    c) at least one layer of a mesh fabric disposed about the gas-generating material and ignition means;
    d) a non-metallic non-fragmenting high-pressure component disposed about said gas-generating material, said ignition means and said mesh fabric, said high-pressure component comprising an electric high-pressure bag constituted from a pressure-resistant and tear-resistant fabric;
    e) at least one rupturing location incorporated into the high-pressure component; said at least one rupturing location being adapted to rupture upon reaching a predetermined internal gas pressure; and
    f) a low-pressure bag collectively disposed about said gas-generating material, said ignition means, said mesh fabric, said high-pressure component and said at least one rupturing location, and gas flowing into said bag through said at least one rupturing location to fill the low pressure bag with gas.

2. A gas generator as claimed in claim 1, wherein a tearing force for opening said at least one rupturing location on the high-pressure component is determined through the resistance to tearing of at lest one of a seam, adhesive means, plastic spray molding, welding, vulcanization, snap fasteners and tearable fastener as possessing a controllable opening force.

3. A gas generator as claimed in claim 1, wherein the high-pressure component and the low-pressure bag are configured as flat components.

4. A gas generator as claimed in claim 3, wherein the low-pressure bag encompasses the high-pressure component at lest partially extending in a ring-shaped configuration about the periphery of the high-pressure component.

5. A gas generator as claimed in claim 1, wherein a cooling filter component is arranged in the low-pressure bag, said filter being selected from the group of materials consisting of stainless steelwool, aluminum wool, glasswool, stoneware wool, carbon- and boron-fiber wool, a mixture of said materials, and fiber mats formed from said materials having a mesh size of from 0.5 to 10 mm.

6. A gas generator as claimed in claim 1, wherein a detoxifying filter component is arranged in the low-pressure bag, said filter being selected from the group of materials consisting of organic and inorganic substances, and oxidizing and catalytic materials including activated charcoal, diatomaceous earth, aluminum oxide and zeolite.

7. A gas generator as claimed in claim 1, wherein the at least one rupturing location is located at least proximate to an outer end of the low-pressure bag in the direction of the gas flow; and netting-like fabric covering said at least one rupturing location.

8. A gas generator as claimed in claim 1, wherein the low-pressure bag includes at least one cooling filter component of temperature-resistant materials.

9. A gas generator as claimed in claim 1, wherein the low-pressure bag includes at least one detoxifying filter component possessing a high adsorptive capacity.

10. A gas generator as claimed in claim 1, wherein a reversible closure closes off said high-pressure component from said low-pressure bag.

11. A gas generator as claimed in claim 1, wherein the fabric of said high-pressure bag is coated with silicon rubber.

12. A gas generator as claimed in claim 1, wherein the fabric of said high-pressure bag is internally rubberized.

13. A gas generator as claimed in claim 1, wherein an irreversible snap closure closes off said high-pressure component from said low-pressure bag.

* * * * *

UNITED STATES PATENT AND TRADEMARK OFFICE
CERTIFICATE OF CORRECTION

PATENT NO. : 5,275,433
DATED : January 4, 1994
INVENTOR(S) : Martin Klober, et al.

It is certified that error appears in the above-indentified patent and that said Letters Patent is hereby corrected as shown below:

Column 1, line 19: "damping" should read --damming--

Column 3, line 35: after "unit" insert --.--

Column 6, line 40: "lest" should read --least--

Signed and Sealed this

Sixth Day of September, 1994

Attest:

BRUCE LEHMAN

Attesting Officer     Commissioner of Patents and Trademarks